United States Patent [19]
Cheetham

[11] Patent Number: 5,127,347
[45] Date of Patent: Jul. 7, 1992

[54] METHOD AND APPARATUS FOR THE REDUCTION OF SOLID WASTE MATERIAL USING COHERENT RADIATION

[75] Inventor: Eric Cheetham, Cogan Station, Pa.

[73] Assignee: Phoenix Environmental, Ltd., Montgomery, Pa.

[21] Appl. No.: 507,347

[22] Filed: Apr. 9, 1990

Related U.S. Application Data

[62] Division of Ser. No. 410,560, Sep. 21, 1989, Pat No. 4,960,380.

[51] Int. Cl.⁵ .............................................. F23D 1/00
[52] U.S. Cl. .................................. 110/347; 110/216; 110/266
[58] Field of Search ................. 110/347, 215, 211, 266

[56] References Cited

U.S. PATENT DOCUMENTS

| | | |
|---|---|---|
| 1,130,212 | 3/1915 | Steere . |
| 2,800,091 | 7/1957 | Lotz et al. ............................ 110/266 |
| 2,917,011 | 12/1959 | Korner ................................. 110/266 |
| 2,979,000 | 4/1961 | Sifrin et al. ......................... 110/266 |
| 2,983,847 | 5/1961 | Spengler . |
| 3,440,800 | 4/1969 | Messen-Jaschin . |
| 3,656,441 | 4/1972 | Grey et al. . |
| 3,722,733 | 3/1973 | Neumann . |
| 3,771,468 | 11/1973 | Kelly . |
| 3,780,675 | 12/1973 | Frye et al. . |
| 3,832,519 | 8/1974 | Wolf et al. . |
| 3,834,326 | 9/1974 | Sowards . |
| 3,910,207 | 10/1975 | Altmann . |
| 3,913,499 | 10/1975 | Watts . |
| 3,918,374 | 11/1975 | Yamamoto et al. . |
| 4,012,301 | 3/1977 | Rich et al. . |
| 4,038,108 | 7/1977 | Engel et al. . |
| 4,167,463 | 9/1979 | Conrad . |
| 4,181,504 | 1/1980 | Camacho . |
| 4,213,404 | 7/1980 | Spaulding . |
| 4,253,409 | 3/1981 | Wormser . |
| 4,266,948 | 5/1981 | Teague et al. . |
| 4,279,208 | 7/1981 | Guillaume et al. . |
| 4,291,634 | 9/1981 | Bergsten et al. . |
| 4,308,807 | 1/1982 | Stokes . |
| 4,320,709 | 3/1982 | Hladun . |
| 4,346,661 | 8/1982 | Nakamura . |
| 4,367,130 | 1/1983 | Lemelson . |
| 4,384,968 | 5/1983 | Polizzotti et al. . |
| 4,397,823 | 8/1983 | Dimpfl . |
| 4,398,471 | 8/1983 | Thomanetz . |
| 4,408,985 | 10/1983 | Anderson et al. . |
| 4,411,695 | 10/1983 | Twyman . |
| 4,417,529 | 11/1983 | Fujimoto et al. . |
| 4,432,344 | 2/1984 | Bennington et al. . |
| 4,438,705 | 3/1984 | Basic, Sr. . |
| 4,438,706 | 3/1984 | Boday et al. . |
| 4,447,262 | 5/1984 | Gay et al. . |
| 4,479,443 | 10/1984 | Faldt et al. . |
| 4,509,434 | 4/1985 | Boday et al. . |
| 4,526,712 | 7/1985 | Hirano et al. . |
| 4,539,916 | 9/1985 | Paoluccio . |
| 4,552,667 | 11/1985 | Shultz . |
| 4,561,364 | 12/1985 | Green et al. ......................... 110/266 |
| 4,574,714 | 3/1986 | Bach et al. . |
| 4,579,067 | 4/1986 | Peters . |
| 4,582,004 | 4/1986 | Fey et al. . |
| 4,599,955 | 7/1986 | Hepworth et al. ................. 110/347 |
| 4,602,574 | 7/1986 | Bach et al. . |
| 4,615,283 | 10/1986 | Ciliberti et al. . |
| 4,615,285 | 10/1986 | Bentell et al. . |
| 4,631,384 | 12/1986 | Cornu . |

(List continued on next page.)

Primary Examiner—Henry C. Yuen
Attorney, Agent, or Firm—Panitch Schwarze Jacobs & Nadel

[57] ABSTRACT

Coherent radiation is used to provide the energy, excite and sustain of plasma in which solid waste materials are reduced to a slag-like material from which has been removed the more harmful constituents. The effluvia of the plasma reduction process is scrubbed to remove particulates and the gas is processed by additional heating to eliminate products of incomplete combustion and/or chemically convert harmful constituents. The remaining gas is then safely exhausted into the atmosphere. The solid waste material may be the ash by-product of prior incineration.

16 Claims, 8 Drawing Sheets

U.S. PATENT DOCUMENTS

| | | |
|---|---|---|
| 4,644,877 | 2/1987 | Barton et al. . |
| 4,651,656 | 3/1987 | Wallner et al. . |
| 4,685,220 | 8/1987 | Meenan et al. . |
| 4,685,404 | 8/1987 | Sheppard et al. .................... 110/266 |
| 4,688,495 | 8/1987 | Galloway . |
| 4,695,447 | 9/1987 | Shultz . |
| 4,695,448 | 9/1987 | Anthony . |
| 4,702,808 | 10/1987 | Lemelson . |
| 4,718,362 | 1/1988 | Santen et al. . |
| 4,724,776 | 2/1988 | Foresto . |
| 4,732,091 | 3/1988 | Gould . |
| 4,759,300 | 7/1988 | Hansen et al. . |
| 4,771,361 | 9/1988 | Varga . |
| 4,781,171 | 11/1988 | Hemsath . |
| 4,793,270 | 12/1988 | Karasek et al. . |
| 4,821,653 | 4/1989 | Jones . |
| 4,848,995 | 7/1989 | Sarnish ................. 110/216 |
| 4,873,930 | 10/1989 | Egense et al. ....................... 110/347 |
| 4,886,000 | 12/1989 | Holter et al. . |
| 4,909,160 | 3/1990 | Frick et al. ........................... 110/216 |
| 4,920,898 | 5/1990 | Solbes et al. ........................ 110/347 |
| 4,958,578 | 9/1990 | Houser ................................. 110/216 |

METHOD AND APPARATUS FOR THE REDUCTION OF SOLID WASTE MATERIAL USING COHERENT RADIATION

This is a division of application Ser. No. 410,560, filed Sep. 21, 1989, U.S. Pat. No. 4,960,380.

BACKGROUND OF THE INVENTION

I. Field of the Invention

The disposal of solid waste material, particularly hazardous waste material, is a continuing problem. Hazardous waste materials must be properly handled to avoid damage to humans and the environment.

This invention relates to a method and apparatus for the reduction of solid waste material using coherent radiation. More particularly, this invention relates to a method and apparatus for reducing solid waste material to a slag-like composition using a plasma energized by coherent radiation.

The solid waste material may be combustible excitation material or, the solid waste may itself be the product of prior combustion such as incinerator ash. The ash or like material is processed with combustible excitation material which itself may be a waste material.

The combination of combustible excitation material and the products of prior combustion are heated in a plasma of sufficient volume and temperature to reduce the waste to a relatively harmless disposable slag-like material and an effluvia of gas and particulates. The effluvia is cleansed of harmful materials, such as products of incomplete combustion (PICs) and heavy metals, and otherwise processed for ready disposition. The slag-like product of the present invention is pebble-like hard material which is environmentally safe.

Incineration of waste material is a principal method of waste disposal. However, the ash by-product of incineration (commonly called fly ash or bottom ash) is itself considered to be hazardous waste since it contains heavy metals and other hazardous substances such as arsenic and dioxins. Such substances are dangerous to humans and will contaminate the environment unless the ash is disposed of in a safe manner. Safe disposal is costly and itself represents an ever present risk to the environment. It is therefore desirable to provide a method and apparatus for further reducing fly ash and similar incinerated waste to materials which are relatively more suitable for environmentally safe disposal or even as useful products. It is also desirable to provide a method and apparatus for the reduction of solid waste materials which are considered to be extremely hazardous such as solid medical wastes. The present invention is directed to a method and apparatus for the reduction of such solid waste materials using coherent radiation.

II. Description of the Prior Art

Methods and apparatus for reducing to separable constituents, including waste materials, using coherent radiation have been proposed in the past but none is known to be practicable. The reduction of solid materials in a plasma is also known although such plasmas are not necessarily initiated and sustained by directing coherent radiation at the material to be reduced to separable constituents.

Other deficiencies in high temperature waste reduction processes have limited their utility. These involve difficulties in processing the effluvia of the combustion process which are themselves hazardous and therefore require costly special treatment.

III. Summary of the Invention

In accordance with the present invention, coherent radiation is used to provide the energy to excite and sustain a plasma in which solid waste is reduced to a slag-like material from which has been removed the more harmful constituents. The solid waste material may be conventional solid wastes but the present invention is principally intended for the reduction of the ash by-product of prior incineration, known as fly ash or bottom ash. The effluvia of the plasma reduction process take the form of particulates and gaseous by-products of the reduction process. In accordance with the present invention, the particulates are scrubbed and filtered from the effluvia. The gas is processed to destroy or chemically convert harmful constituents. The remaining gas is then safely exhausted into the atmosphere.

Thus the present invention is directed to a method and apparatus for the reduction of solid waste material in a plasma, especially incinerator ash, using coherent radiation as the source of energy for the plasma. The plasma is sustained at an useful volume by adding to the solid waste, as necessary, an aggregate of more readily combustible excitation materials. Preferably these combustible excitation waste materials are waste materials (herein excitation waste) which have not yet been burned. Examples of excitation waste are metal and wood chips resulting from manufacturing processes.

The present invention has particular utility in that it uses coherent radiation produced by a laser at relatively low power levels. Excitation of the plasma is obtained and sustained, and the acceptability of the atmospherically exhausted gases is determined as part of the process. The coherent radiation is provided by a relatively low power $CO_2$ laser.

In accordance with the present invention solid waste material, especially a product of prior incineration, is heated in a plasma of proper size causing the material to disassociate and reassociate into a slag-like material and an effluvia of gas and particulates. The plasma is excited by coherent radiation, and where the waste material is fly ash or the like, combustible wastes are included to help excite the plasma. The present invention is particularly directed to the reduction of solid waste material. The excitation wastes are in part excited and reduced in a secondary reaction chamber which serves to heat the effluvia to destroy products of incomplete combustion (PICs) by chemical reaction or disassociation and reassociation into less harmful materials which can be processed or otherwise converted to carbon dioxide ($CO_2$), water and salts. The molten product of the secondary reaction chamber flows into the primary chamber where the fly ash is excited by coherent radiation and converted into slag an the effluvia.

The apparatus for accomplishing the process includes a primary reaction chamber within which the solid waste material is heated in a plasma excited by a laser; a secondary reaction chamber wherein the excitation waste is heated and wherein further reduction of the effluvia takes place electrostatic scrubbers for removing particulates and certain metals from the effluvia; and a gas treatment process.

The slag-like product of the present invention is produced in small pebbles which are relatively free of contaminants and therefore can be safely disposed of.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DESCRIPTION OF THE PREFERRED EMBODIMENT

Figure 1:
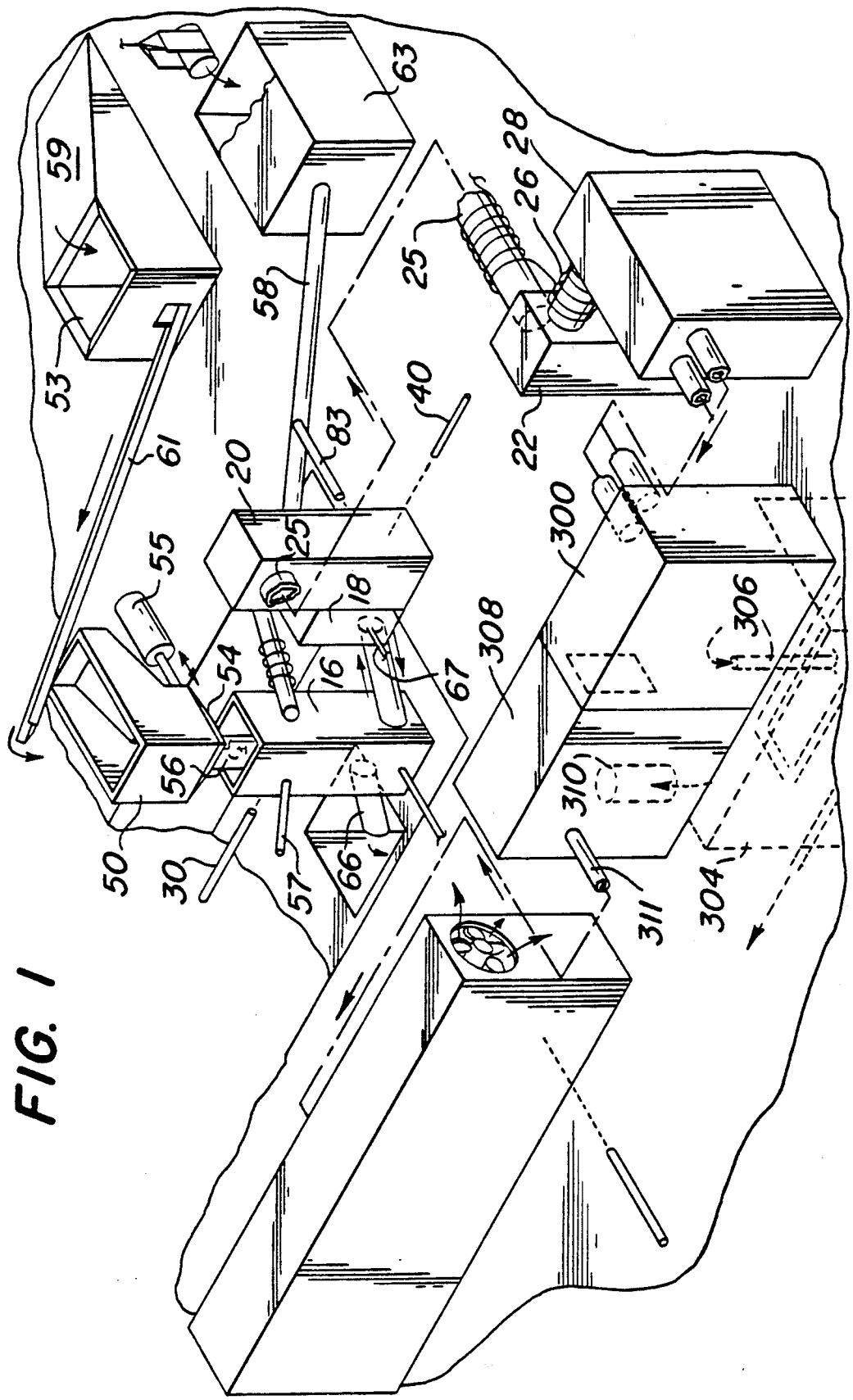
FIG. 1 is a schematic layout of the system apparatus used to perform the process of the present invention.

Referring now to the drawings in detail, wherein like numerals indicate like elements, FIG. 1 schematically illustrates the system apparatus for implementing the process of reducing solid waste material using coherent radiation. The overall structure is shown in more detail in FIGS. 2 and 3.

The masonry structure 10 houses the major components of the apparatus including the reaction chambers 16 and 18 in which the waste material is reduced. Masonry structure 10 preferably is made of steel reinforced concrete. Temperature sensors 12 are positioned within the structure 10 to monitor the heat absorbed by the masonry. Such temperature sensors are connected to appropriate control and safety systems (not shown) for monitoring the temperatures within the walls to prevent crumbling and other adverse effects of heat on the masonry. The interior of each of the reaction chambers is covered with Francet or a similar heat resistant ceramic material.

Positioned within the masonry structure 10 is an inner confinement structure 14 made of refractory brick. The inner confinement structure 14 provides the principal means for housing the primary and secondary reaction chambers 16 and 18, the primary and secondary stacks (or flues) 20 and 22, the scrubber 25, and the heat exchangers for cooling the gaseous and particulate by-products of the process. More particularly, located within the inner confinement chamber 14 is the primary reaction chamber 16, the secondary reaction chamber 18, the primary stack or flue 20, the secondary stack or flue 22, electrostatic scrubber 25, heat exchanger 26, and cooling chamber 28. The operation and functional interrelationship of each of the foregoing elements is explained hereinafter.

Located outside of the structure 10 is a carbon dioxide ($CO_2$) laser 30 whose optical axis 32 passes through the primary reaction chamber 16 to provide energy for exciting the plasma used to reduce solid waste material. The coherent radiation generated by the laser 30 passes along optical axis 32 through aperture 34 in the masonry structure 10 and aperture 48 in confinement wall 14. Aperture 34 is controlled by a light valve 36. The optical axis 32 passes through apertures 34, 48 in the walls of primary reaction chamber 16 to the point of excitation 38 within primary reaction chamber 16. Optical axis 32 also passes through the primary stack 20. The optical axis 32 is preferably pitched at an axis of from 5° to 10° from the horizontal.

The optical axis 32 is aligned with the optical axis of the helium neon laser 40 for properly aligning the laser 30 to direct coherent radiation along the optical axis 32 through the point of excitation 38. A visible light laser, such as laser 40, is required because the radiation emitted by a $CO_2$ laser is not visible.

Due to the length of the optical path 32, it is necessary to provide a means for aligning the coherent radiation emitted by laser 30. This is accomplished using the helium-neon laser 40 as an auto collomator. The auto collomator guides adjustment of the optical axis 32, left, right, up or down. It also adjusts its azimuth. Although other auto collomators are available, an Accu-ray 1007 available from Phoenix Environmental Ltd., the assignee of this invention, may be used as the auto collomator. Of course, other optical means for aligning the radiation emitted by $CO_2$ laser 30 along an optical axis 32 may be used as desired.

The principal purpose of the present invention is to provide an apparatus and process for reducing solid waste materials, especially fly ash, to a slag-like solid material and a gaseous effluent. The gaseous effluent is supplementally heated and scrubbed to remove harmful products of incomplete combustion and particulates. Thereafter, the effluent is further processed to convert or neutralize other constituents of the effluent to make it safe for release into the atmosphere. The present invention finds particular utility in the use of coherent radiation to excite a high temperature plasma (e.g. approximately 10,000° F.) for reducing waste materials which cannot be reduced by conventional combustion, such as fly ash, or waste materials which cannot be safely burned in a conventional manner such as medical waste.

Fly ash is a by-product of conventional combustion processes such as are performed in municipal incinerators. As such, it will no longer readily burn in a conventional sense, that is by oxidation. It is therefore necessary to provide high temperatures in order to separate the ash into its constituents for removal of selected undesirable constituents. It is also desirable to convert the ash into a stone-like material (i.e. slag or lava). This effectively locks in or binds any remaining undesirable constituents to prevent them from leeching or otherwise entering the environment when the slag-like product of this invention is stored at an outdoor disposal site or put to useful purpose.

It should be noted that the solid product resulting from the process described herein is called a slag. It may also be called lava. But the product is not a slag which is a by-product of steel making; nor is it solidified rock lava emitted from fissures in the earth's crust. These terms are chosen simply to characterize the products' hard, stone-like physical appearance. The slag's actual chemical make-up is determined by chemical and/or physical analysis.

Reduction of fly ash requires high temperature plasmas to disassociate the constituent materials. In accordance with the present invention, such plasmas are excited by coherent radiation generated by a laser. Moreover, such plasmas are generated by combining the solid waste with combustible materials especially combustible waste materials such as wood chips or steel chips. The combustible materials act as a fuel to provide a plasma of sufficient volume for effecting the desired reduction of the solid waste materials. Stated otherwise, one of the features of the present invention is the use of materials from the waste stream (e.g. steel or wood chips) to initiate and effect the reduction of the fly ash. Another feature is the use of particulate such as chips to create a plasma of effective volume.

While the reduction of the solid waste material is taking place, the slag is removed from the primary reaction chamber through a slag receiving opening 42. The effluvia of gases and particulates which have been ionized and disassociated in the plasma are further heated, scrubbed and treated as hereinafter described.

Figure 4:
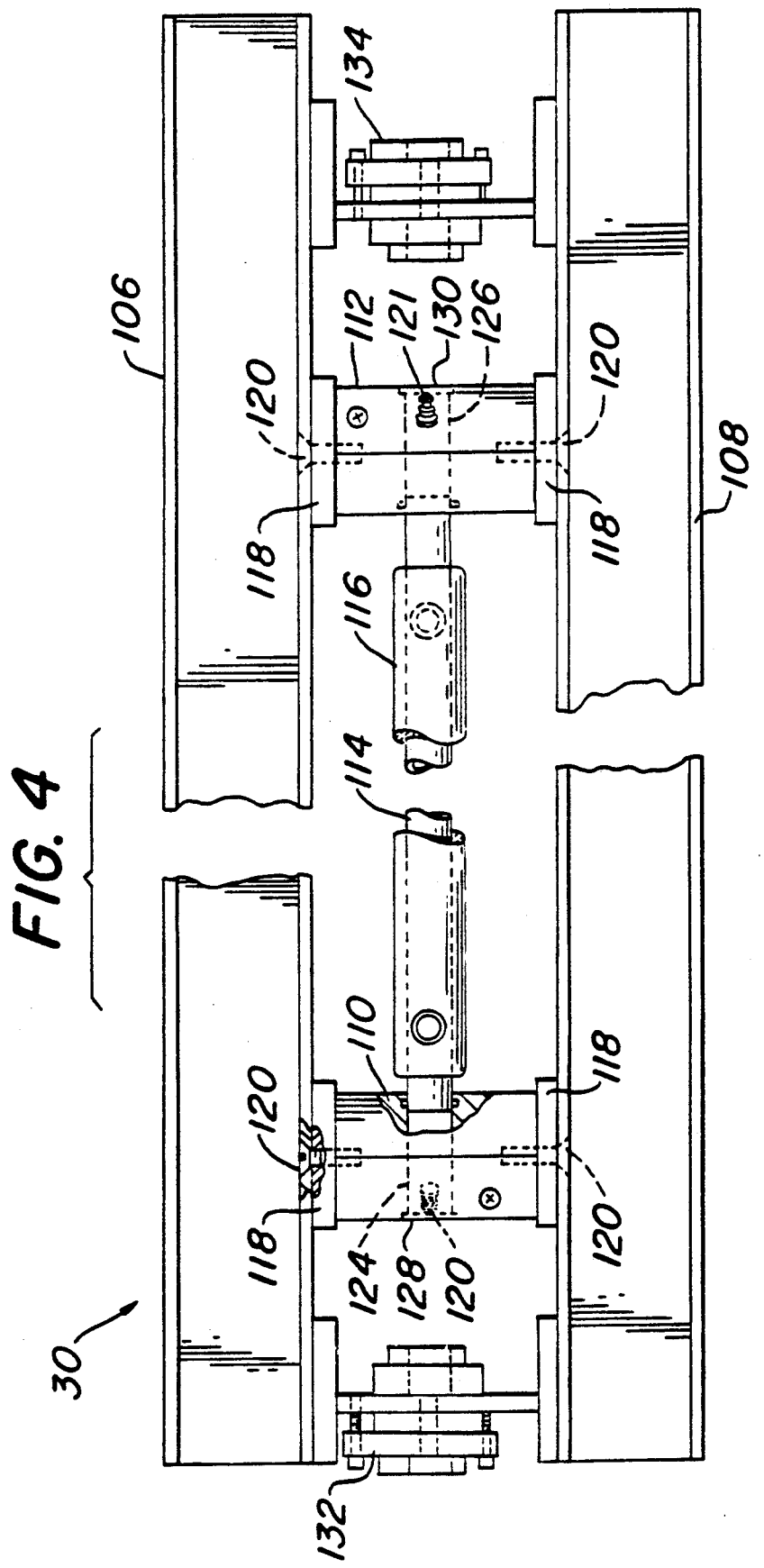
FIG. 4 is a longitudinal sectional view of the CO2 laser used with the present invention.

Laser 30, as more particularly shown in FIG. 4, is mounted between aluminum I beams 106, 108. I beam 108 is rigidly fixed to a granite slab, not shown. Laser 30 is preferably a 50 to 100 watt carbon dioxide ($CO_2$) laser. Such lasers are available in the open market and any appropriate brand of laser may be selected for use with the present process. However, the laser used with the present invention is constructed by the inventor and is of the type illustrated in FIG. 4.

The coherent infrared radiation generated by laser 30 passes along optical path 32 through aperture 34 in the wall of masonry structure 10. Aperture 34 is approximately ⅜ inches in diameter, which matches the diameter of the beam of coherent radiation. Aperture 34 is controlled by light valve 36, which functions to remove any undesirable fringes from the beam of coherent radiation. The aperture 34 (and all other apertures in the optical axis 32) is precisely aligned with the optical axis so as to permit entrance of the radiation through structure 10 and into the confinement chamber 14 (through aperture 48) while at the same time minimizing the escape of effluents.

It should be noted that it is not necessary to focus the coherent radiation. However, the coherent radiation is collomated.

A heat exchanger 46 connected to a reservoir of cooled liquid (e.g. water) maintains the light valve 36 at properly operating temperatures.

The coherent radiation also passes through an opening into primary reaction chamber 16 and through the point of excitation 38.

Solid waste material is fed from hopper 50 into the primary reaction chamber through gate valve 54 controlled by actuator 55. Solid waste is conveyed by conveyor 61 into hopper 50 from tipping bay 53 at the end of loading ramp 59. The waste material falls through tube 56 where it may be partially preheated. Thus, solid waste material to be treated according to the process and apparatus of the present invention flows in to the primary chamber to the area encompassing the point of excitation 38. See FIG. 3. Preferably the flow is assisted by recirculated gases from the process released down the reaction chamber 16. Recirculated gases from compressor 316 (FIG. 10) are emitted into tube 56 from pipe 57. Tube 56 may be Pyrex lined.

Reaction chamber 16 is divided into a primary reaction core 77 and a primary reservoir 79. Initial excitation of the fly ash takes place in core 77. The slag thus formed first flows in to reservoir 79 which is in open communication with the secondary reaction chamber 18 through inclined flow tube 64. Once the reservoir 79 is filled, slag flows through exit tube 66 whose entrance is at a higher level than the floor of core 77.

The apparatus also includes a secondary reaction chamber 18. This chamber is used to re-burn effluvia coming from primary chamber. It is also used to heat the plasma excitation waste material, for example wood and/or steel chips, using a second $CO_2$ laser 83. As shown, the optical path 30 of the laser beam also passes through primary stack 20.

The interior of both the primary and secondary reaction chambers is coated with a hard, heat resistant material such as refractory brick or industrial diamonds.

The excitation waste is fed from hopper 63 by screw conveyor 58 into the secondary reaction chamber 18. Material flow into chamber 18 may be assisted by recirculated gases from compressor 316 to tube 59 if desired. Oxygen from the source 68 iq provided through lance 72. The hot effluent gases from the primary reaction chamber 16 reduce the excitation waste to a molten slag and effluent. The molten excitation waste flows down tube 64 into the primary chamber 16.

Within the primary chamber, the excited excitation waste combines with the waste material and is raised to plasma temperatures by the coherent radiation from laser 30. At startup excitation waste material may be mixed with waste material in hopper 50 and fed directly into primary reaction chamber 16 as well. However once the process reaches operating conditions (homeostasis) only fly ash is fed into the primary reaction chamber.

The principal reduction reaction takes place in primary reaction chamber 16 where the presence of a plasma raises the temperature of the waste material (and the startup excitation waste) to temperatures high enough to cause such material to disassociate or otherwise ionize. As a consequence, an effluvia of gases and particles is formed. The effluvia flows up the tube 64 into the secondary reaction chamber. The effluvia also flows through water cooled exhaust tube 65 to chamber 20. The major constituent of the ionized waste material cools and recombines outside of the plasma. It forms a molten, slag-like material. The molten slag fills the reaction core 77 and flows into the primary reservoir 79 until it too is filled. Molten material from secondary reaction chamber 18 also flows down tube 64 into reservoir 79. The entire reservoir 77, 79 fills to a depth of 4 to 5 inches until slag flows out through exit tube 66 to lava receiving tube 42. Slag flows through tube 42 into a receiving container 43 which, when filled, transports the slag to another location.

The reduction process is initiated by placing a mixture of fly ash and the excitation waste (e.g. wood and/or steel chips, although steel chips are preferred) in a small ladle 87 positioned at the excitation point 38. The excitation point 38 is four to five inches above the floor of the reaction chamber 16. The ladle 87 is made of a diaelectric ceramic, such as muscovite or Francet. One-half inch openings in the side of the ladle permit the coherent radiation to impinge directly on the mixed waste and excitation material held within the ladle. This material is heated by the coherent radiation to plasma temperatures. The ladle disintegrates during the start up procedure.

Oxygen is also provided throughout the process. In particular, oxygen from a source 68 is piped through lances 70 and 72 into the primary and secondary reaction chambers at the rate of three to four ft$^3$ per minute.

A feature of the present invention is the use of particulate waste material to start and maintain the plasma. It has been found that although it is possible to reach plasma temperatures by directing the coherent radiation into large blocks of waste material, such plasmas are too small to be effective. By using an aggregate of particulate waste material, the plasma can be excited to fill the reaction chamber 16. This expanded plasma engulfs the waste material and permits reduction thereof at commercially practicable rates. Initial tests of the process in an experimental chamber have resulted in waste material treatment rates of 5 pounds per minute. Present scale up calculations indicate that rates of 10 to 20 times per 20 hour day should be capable of being accomplished. In theory the process could treat 60 tons/day but this rate would exceed pollution controls.

At start up, the laser 30 is operated at approximately 25 watts per cm$^2$ (continuous wave (cw)) to excite the starting material to plasma temperatures. At full scale waste material processing, the laser is operated at between 50 to 100 watt per cm$^2$ cw.

Reaction chamber 16 is 9.75"×18" in width and length. The plasma fills the entire chamber.

As previously indicated, a gaseous and particulate effluvia is a principal product of the disassociation of the waste material. This gas includes arsenic, cyanide, carbon monoxide, alcohol, sulphur, and other organic substances such as dioxins. Heavy metal, metal and other particulates are entrapped within the gas. The heavy metals include beryllium, lead, mercury, chromium, zinc, gold, silver, and cadmium.

The effluvia flows up the tube 64 to the secondary reaction chamber 18. This gas is heated as it flows over the molten excitation material moving from the secondary reaction chamber to the primary reaction chamber. The heat from the excitation materials raises the temperature of the gas to force full disassociation. Thus, the presence of the excitation material in the tube 64 increases the residence time of the effluvia to raise its temperature. The CO$_2$ laser 83 may be used to supplement the heating of the excitation waste.

Another purpose of the secondary reaction chamber 18 is to eliminate products of incomplete combustion including certain particulates. The secondary reaction chamber operates at a temperature of approximately 3,000°-5,000° F.

The effluvia passes from the secondary reaction chamber 18 into the primary stack 20, where at least some of the effluvia is re-heated by the coherent radiation from laser 30. The effluvia passes up the primary stack 20 and through the scrubber 25. See FIG. 5.

Figure 6:
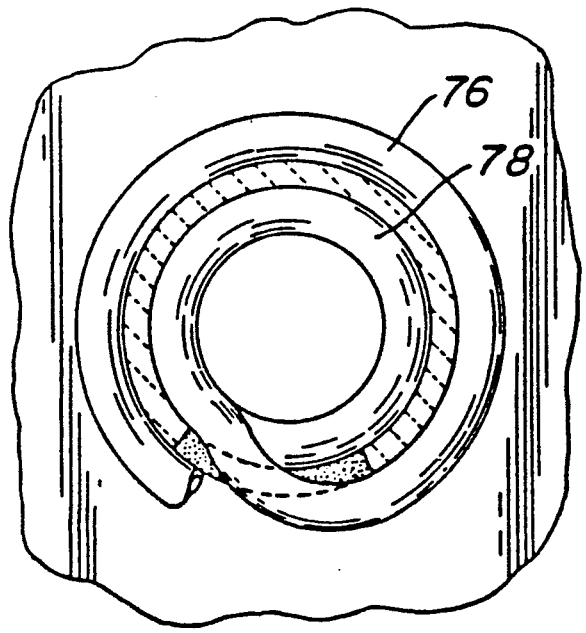
FIG. 6 is a sectional view of the particulate scrubber shown in FIG. 5 taken along the lines 6—6.

The effluvia passes up secondary stack 22 and into the heat exchanger 26. Secondary stack 22 could function as a third reaction chamber by the addition of another laser to heat the gases therein. Heat exchanger 26 comprises a Pyrex borosilicate glass tube with both an external heat exchanger 76 and an internal heat exchanger 78. See FIG. 6. Both heat exchangers are liquid cooled. Scrubber 25 is cooled by heat exchanger 74.

The heat exchanger 26 reduces the temperature of the effluvia flowing through it from 2,000°-3,000° F. to 500° F. The cooled effluvia flows into the cooling chamber 28 where it is further reduced in temperature to between 100° and 200° F. Chamber 28 is a refractory walled chamber lined with ceramic. It includes a heat exchanger 260 for further cooling the effluvia.

Figure 8:
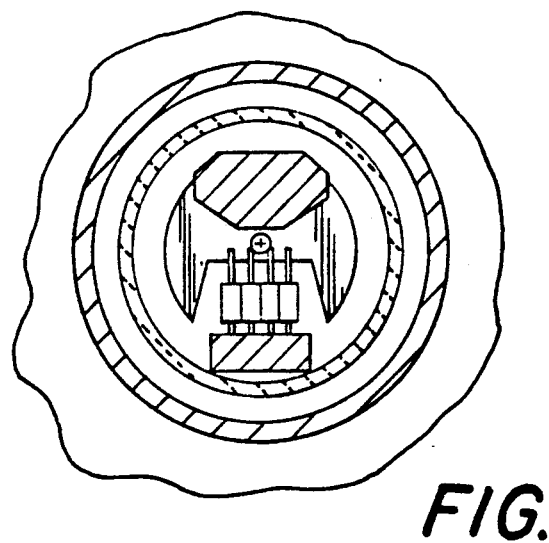
FIG. 8 is a sectional view of the scrubber shown in FIGS. 7A and 7B taken along the lines 8—8.
Figure 7A:
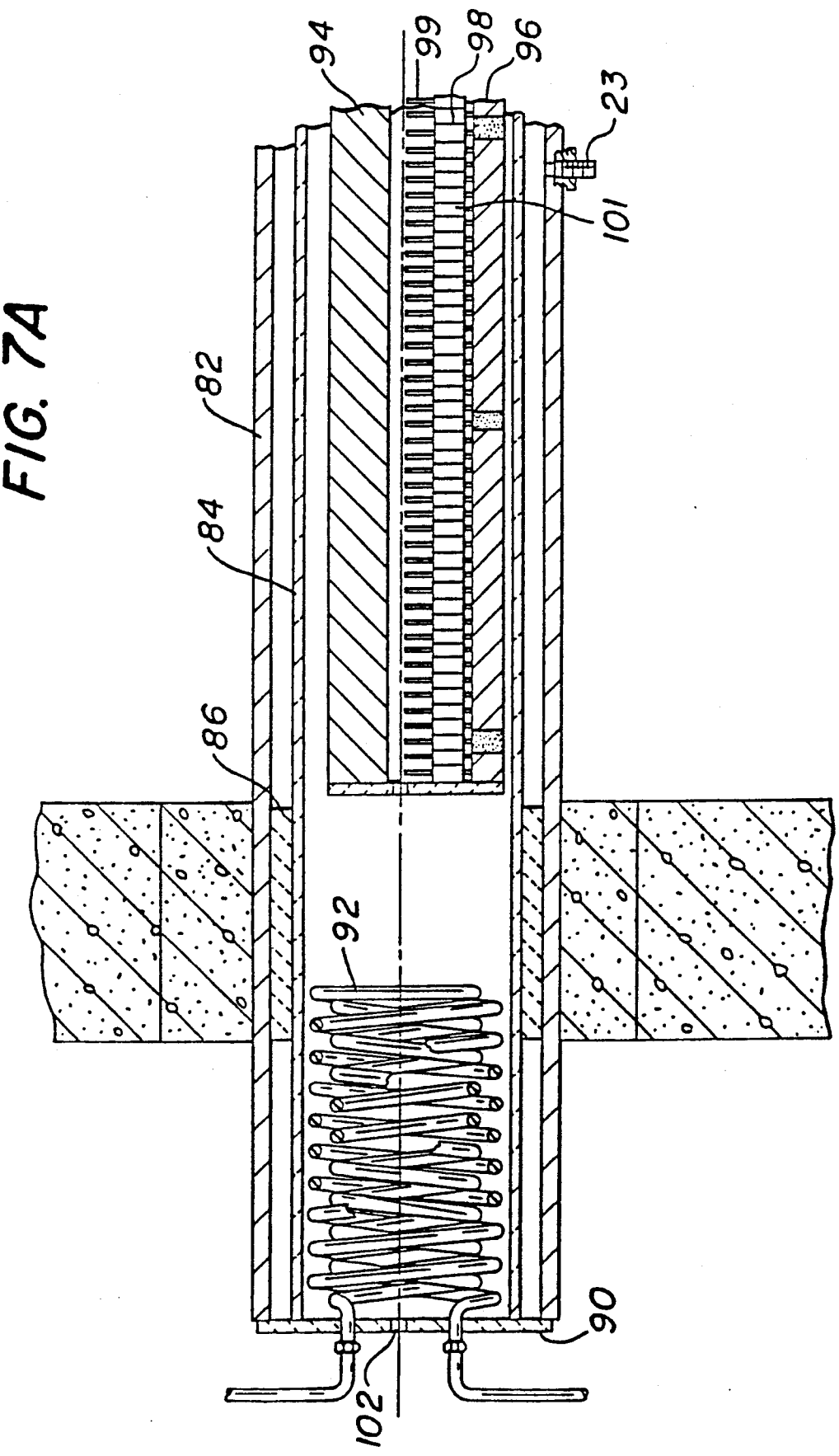
FIGS. 7A and 7B are longitudinal sectional views of a particulate scrubber used with the system apparatus.
Figure 7B:
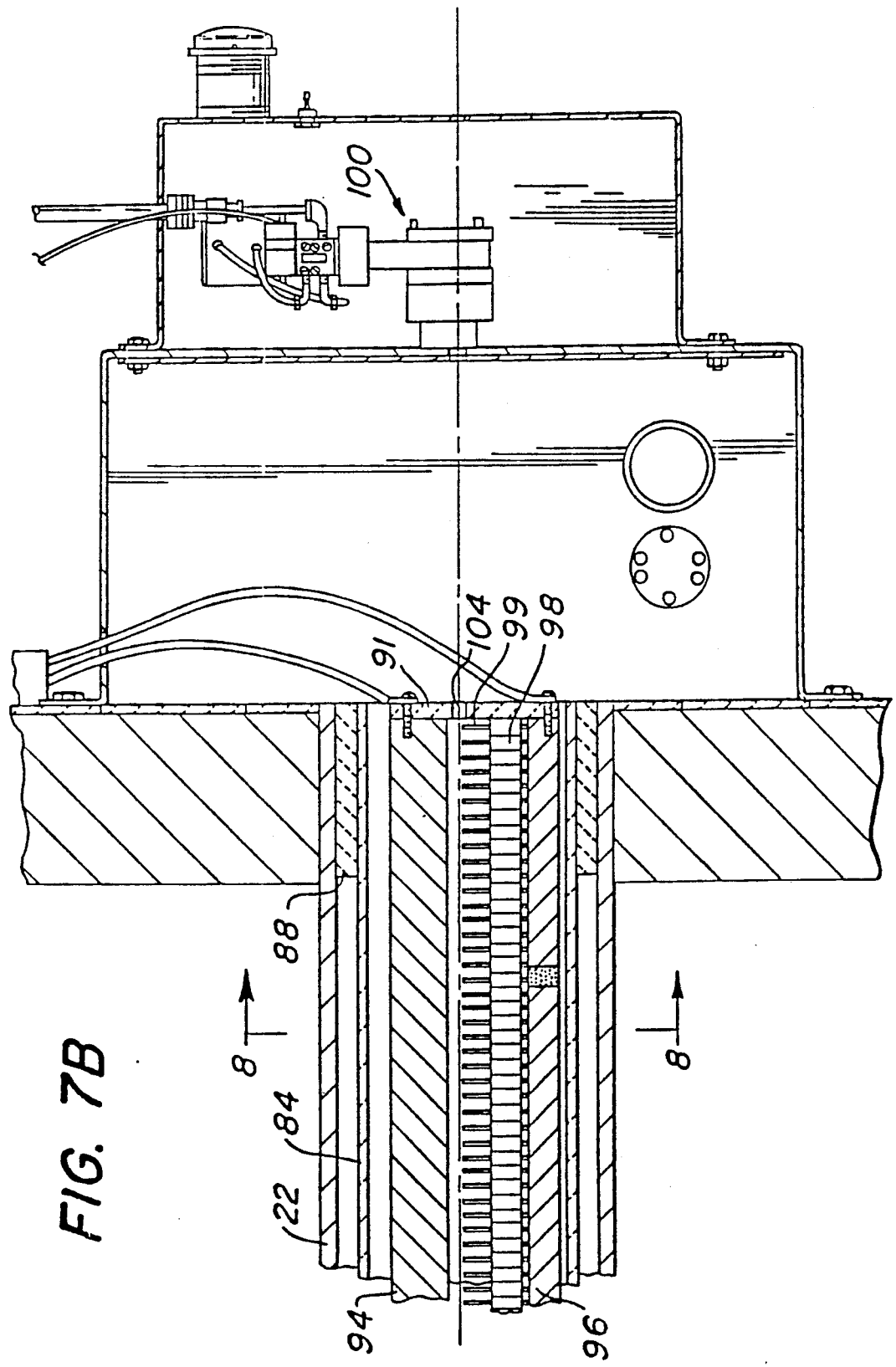

FIGS. 7A, 7B and 8 illustrate the three electrostatic scrubbers 24, 24' and 25 used with the process. The scrubbers 24 and 24' are identical and differ from scrubber 25 only in that scrubber 25 does no include gate valve 100 hereinafter described.

As shown, each scrubber is housed within a protective refractory or metallic shell 82 within which is mounted a borosilicate glass (Pyrex) tube 84 held in place by bushings 86 and 88. Tube 84 is 4 feet in length, has an inside diameter of 7" and a wall thickness of 3/16". The entire electrostatic scrubber is approximately 44 inches in length.

One end of the tubes 82, 84 is closed by the plate 90 provided with a central aperture 102 through which the effluent is drawn. The aperture also provides for the admission of coherent radiation from a helium/neon laser for the purpose hereinafter described. Mounted at the entrance end of the scrubbers 24, 24' is a heat exchanger 92.

Each scrubber includes an elongated brass electrode 94 mounted above an opposing elongated brass electrode 96 which supports 200 pin resistors 98 mounted in four rows of equally spaced and adjacent points along its length. Each of the pin resistors includes a wire pin 99 projecting from a resistive material 101. Each pin resistor is 1,000 ohms and rated at 5 watts. Four rows of 50 pin resistors are provided as illustrated in FIGS. 7 and 8. The distal end of each of the pin resistors is spaced approximately 1 inch from the opposing surface of the brass electrode 94. Each of the resistors is electrically connected to the electrode 96 by a silver solder.

The brass electrodes 94 and 96 are supported by the end plates 90 and 91 which preferably are made of a ceramic, diaelectric material. End plates 90, 91 include apertures 102, 104, respectively, through which effluent is drawn into and out of the scrubbers. Also coherent radiation from a helium neon laser may pass through the apertures.

The electrodes 94 and 96 are connected to a source of high voltage direct current. Electrode 94 is connected to the negative terminal and electrode 96 is connected to the positive terminal. For example, such source may be 15,000 volts. In operation, there will be a current flow between electrodes of between 5 to 50 milliamps.

The effluent is drawn through the scrubber at a rate of approximately 105 cubic feet per minute (measured at the carbon filter 310) for the most efficient operation, although each scrubber will function less efficiently at higher flow rates. The minimum flow rate for each scrubber is approximately 20 ft$^3$ per minute.

The scrubbers 24, 25 expose a large cross section of the electrodes to the gas, and therefore operate efficiently to remove ionized particulates.

Optional control over the flow of the gas through the scrubbers 24, 24' may be provided by an electro neumatic gate valve 100 which includes a sensor for sensing the presence of light provided by a helium neon laser. A helium neon laser (not shown) is mounted with appropriate optics to direct coherent radiation through the apertures 102 and 104 in end plates 90 and 91. The gate valves 100 are not necessary and may be omitted.

In operation, when the sensor detects the presence of the coherent radiation, this acts as an indication that there is no effluvia present. If however the gas is present, there will be sufficient reduction of the light intensity by the particulate material embodied therein to scatter the radiation. This is sensed by the sensor indicating the operating status of scrubbers.

The electrostatic scrubber operates by creating an electrostatic field between the brass electrode 94 and the pin resistors 98. Particulates entrapped within the gas are attracted to the pin resistors and thus scrubbed out of the effluent. Cleanout petcocks 23 are provided.

The electrostatic scrubbers 24 and 24' are mounted in the wall of chamber 28; that is, they extend through walls 14 and 10 into the chamber 300. Scrubbers 24, 24' may be operated singley or in parallel as desired.

Figure 5:
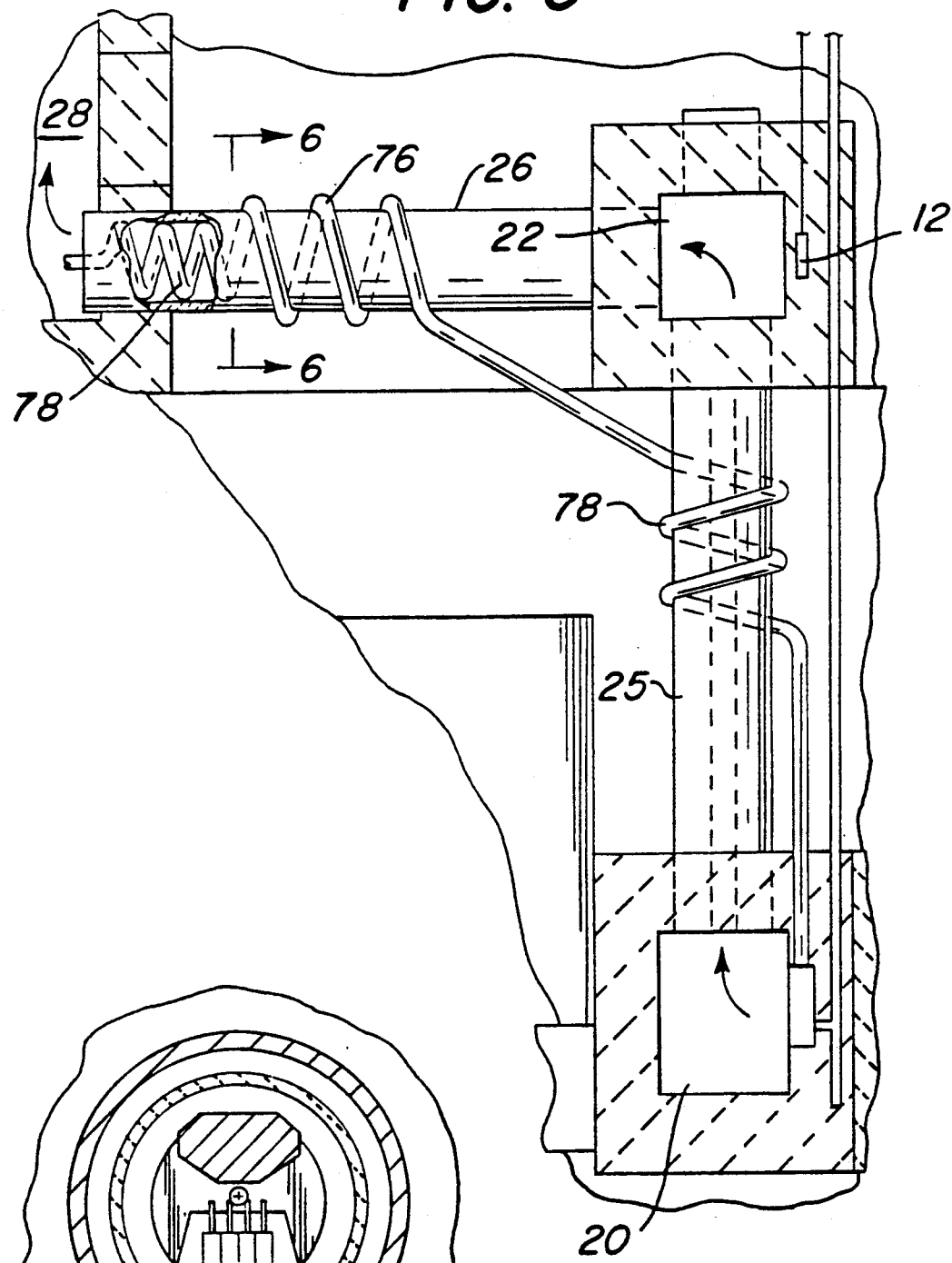
FIG. 5 is a sectional view of the system apparatus taken along lines 5—5 in FIG. 3 showing the primary stack and one of the particulate scrubbers used with the present invention.

The $CO_2$ laser 30 is illustrated in FIGS. 4 and 5. As shown, the laser is mounted on I beams 106 and 108. The I beam 108 is fixed to a granite slab (not shown). The brass high voltage electrodes 110 and 112 support the gas tube 114 which in turn is covered by a are mounted between ceramic insulators 118 and fixed to the I beams by nylon screws 120. The electrodes 110 and 112 are provided with gas fittings 121 and 122 for connection to a source of carbon dioxide and pumping equipment. The ports 124 and 126 through the electrodes 110 and 112 are closed by zinc selenide windows 128, 130.

High reflectivity mirrors 132 and 134 are mounted at opposite ends of the laser 30. The mirrors are mounted on micro-adjustable precision gimbal mounts for proper adjustment. Mirror 132 is fully reflective whereas mirror 134 is 85% reflective. The output mirror 134 is zinc selenide. The mirror 132 is gold or platinum. A phosphor screen may be selectively inserted in the port 126 to align the front mirror in laser 30.

Preferably laser 30 operates at 50-100 watts/$cm^2$ cw.

Figure 2:
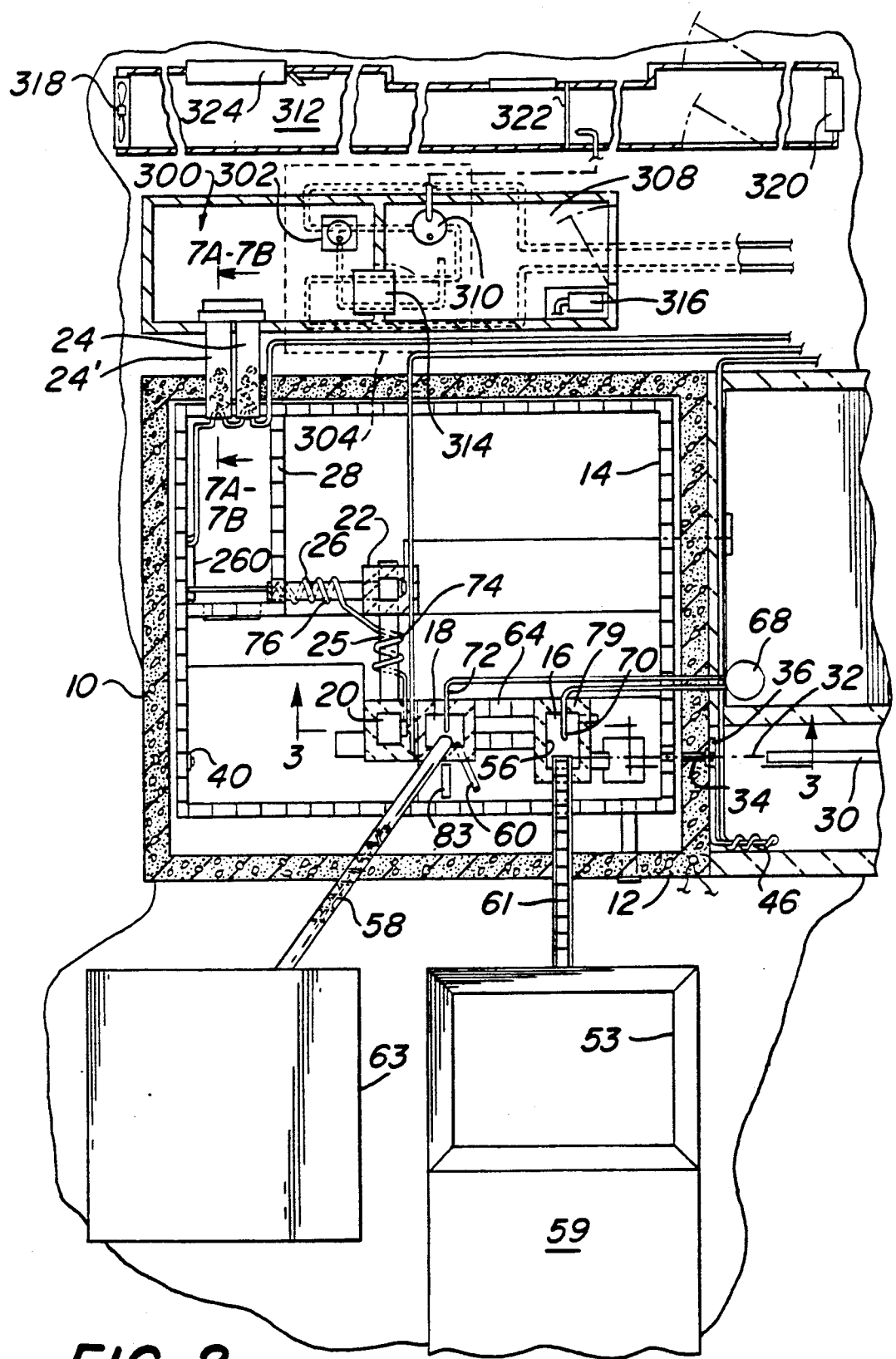
FIG. 2 is a top plan view of the system apparatus with a section taken below the roof or other covering.

As shown in FIGS. 1 and 2, the scrubbers 24 and 24' extend through the walls 14 and 10 into the chamber 300 within which is provided one or more vacuum pumps 302. The vacuum pump is designed to create a vacuum which pulls the effluvia through the entire system including the primary and secondary reaction chambers. In operation, the vacuum pump 302 should draw the effluvia through the system at a rate of approximately 105 cubic feet per minute although other rates may be desirable in some instances.

Figure 9:
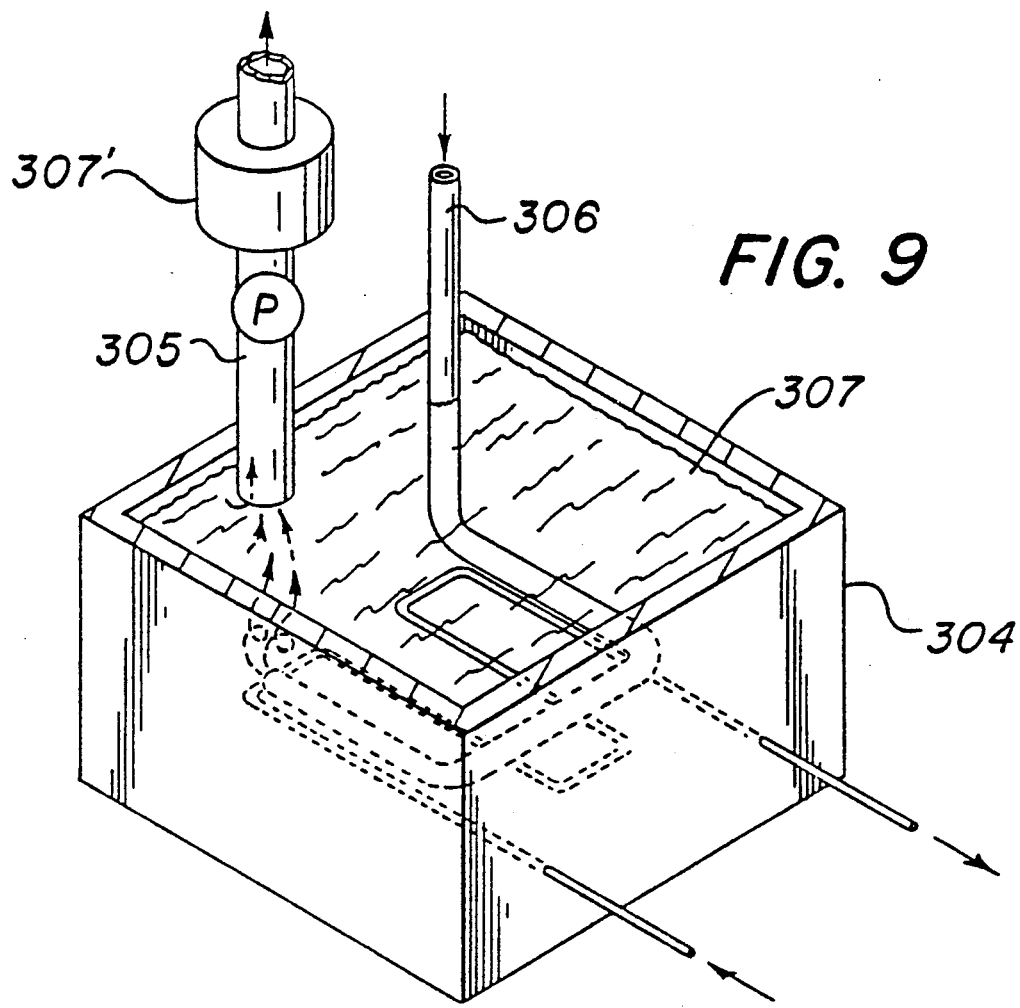
FIGS. 9 is a perspective view of the pool used as part of the effluvia cleansing section of the system apparatus.

The effluvia is pushed by the vacuum pump 302 through pipe 36 into a pool of water 304 located below the chamber 300. See FIG. 9. The now scrubbed effluvia bubbles through the water 307 in pool 304. The effluvia next flows through a pipe 305 and pumps 307 into the chamber 308.

As best shown in FIG. 1, the effluvia flows through the carbon filter 310 and pipe 311 into the wind tunnel 312. The chamber 308 also includes a dehumidifier 314 and a compressor 316. The dehumidifier 314 serves to remove moisture from the effluvia. The compressor 316 is used to draw gases through the system and to recirculate the effluvia for injection into the primary and secondary chambers 16 and 18. It also can be used to cool the slag. The overall flow rate through the compressor is approximately 140 $ft^3$ per minute.

The carbon filter 310 is used to filter substantially all of the remaining particulate matter from the effluvia which then flows into the wind tunnel 312.

The purpose of the wind tunnel 312 is to dilute the effluent, which now consists essentially of carbon dioxide ($CO_2$), oxygen ($O_2$) and water for exhaust into the atmosphere. The wind tunnel 312 includes a fan 318 which draws air into wind tunnel through the heat exchanger 320. As shown, the wind tunnel 312 is an elongated chamber which preferably is set at an approximately 45° angle to the horizontal with the fan 318 at the higher elevation. The wind tunnel 312 is lined with ceramic tile.

The wind tunnel 312 includes a carbon filter 322 for removing particulate matter from the air prior to mixing the air with the effluent.

Within the wind tunnel, effluent is mixed with air and then exhausted by the fan 316 into the atmosphere.

An air quality monitor 324 is mounted on the wall of the wind tunnel 312 adjacent to the fan.

Figure 3:
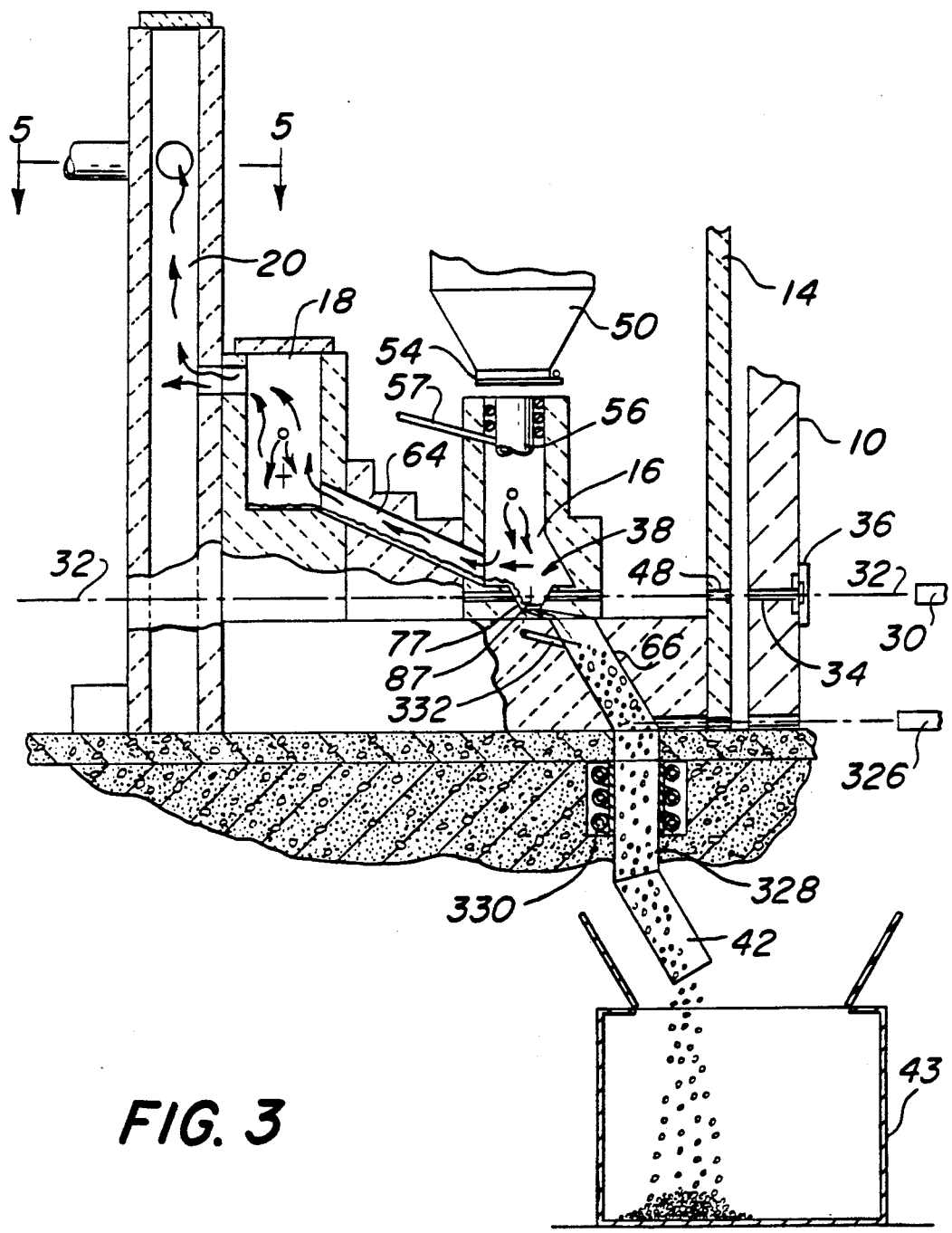
FIG. 3 is a vertical sectional view of the primary and secondary reaction chambers taken along the lines 3—3 in FIG. 2.

FIG. 3 illustrates the manner in which the slag is treated as it flows from the primary reaction chamber 16. The slag stream flows down exit tube 66. In the course of its flow down the tube, it begins to harden. The lava flows through a stream of compressed air directed into the tube 66 through the pipe 332. The compressed air causes the lava stream to separate into small globules which ultimately harden into individual pebbles as they are cooled by the heat exchanger 330. These slag pebbles then flow through tube 42 into the collection container 43.

A $CO_2$ laser 326 is mounted in the tube 66. The coherent radiation emitted by laser 326 impinges upon the lava stream serving to anneal the material.

The lava stream next flows through the tube 328 which is surrounded by the heat exchanger 330. The lava is cooled by the heat exchanger 330.

The process of reducing solid waste material to a more readily disposable slag is commenced by placing a mixture of fly ash and excitation waste in the ladle 87. Coherent radiation at about 25 watts $cm^2$ cw is directed at the ladle which is positioned at the excitation point 38. Simultaneously, a quantity of excitation waste, such as wood and/or steel chips, is augered into the secondary combustion chamber 18 and the hopper 50 is filled with fly ash in readiness for feeding into the primary chamber 16 through the tube 56. The hopper 50 may be continuously filled from the tipping bay 53. Enough ash should be available to maintain the process once initiated. Present calculations indicate that the process will reduce the ash at a rate of approximately 15 pounds per minute.

The coherent radiation from laser 30 impinges upon the starter material within the ladle 87 until it reaches plasma temperatures. It has been found that the use of particulates as a starter material allows the plasma to expand to fill the entire primary reaction chamber 16.

Simultaneously with the initiation of the process, oxygen at approximately 550 CFH inch is emitted into both the primary and secondary reaction chambers through the lances 70 and 72. The oxygen from lance 70 is emitted into the primary reaction chamber 16 at an angle so that the gases within that chamber are forced to circulate within the chamber. This helps distribute the heat throughout the chamber.

As the starter material reaches plasma temperatures, the gate valve 54 is opened and ash is fed into the primary reaction chamber. As noted previously, this ash may be preheated in the tube 56 by the effluent gases which are returned through tube 57 by compressor 316 although such preheating cannot be initiated until after the process is commenced. The hot gaseous effluvia from the initial reduction process flows up tube 64 into the secondary reaction chamber where it ignites the excitation waste contained in that chamber. The heating of the excitation waste in secondary chamber 18 may be supplemented by coherent radiation from laser 83.

The effluvia flowing into the secondary reaction chamber will include volatile organic run offs, carbon dioxide, sulphur, alcohol and products of incomplete combustion.

Once the slag has filled chamber 16 as described above, it flows down tube 66. The slag is converted into a pebble-like form by a blast of compressed air from tube 332. As the slag pebbles leave tube 66, the coherent radiation from laser 326 causes them to anneal and thereby better lock in any remaining metals or other constituents. The slag then falls through tube 328 surrounded by heat exchanger 330 which cools it further. The hardened slag flows through tube 42 into the container 43. When container 43 is filled, it may be moved outdoors to allow the slag to reach ambient temperatures and thereafter be transferred to another site.

The excitation waste is heated by both the $CO_2$ laser 83 and the hot effluvia to near plasma temperatures. It too forms an effluvia which mixes with the existent effluvia. The excitation waste molten slag flows down tube 64 into the primary reaction chamber 16. Thus it too helps maintain the high temperature of the effluvia by exposing it to the surface of the molten slag from the excitation waste.

By maintaining the effluvia at high temperatures, it continues to react and burn the remaining PICs. The effluvia should be maintained at or above 3,000° F. The laser 83 directs coherent radiation into chamber 18 for this purpose. The temperature within the secondary reaction chamber 18 is maintained at between 3,000° to 5,000° F.

The secondary reaction chamber 18 greatly enhances the total output of the system by providing an efficient means for completing the combustion of the effluvia. This allows better control of the effluvia for ultimately exhausting it into the atmosphere.

The addition of oxygen into the secondary reaction chamber through lance 72 converts the carbon monoxide in the effluvia to carbon dioxide.

The effluvia is drawn from the secondary reaction chamber through the primary stack 20 where it is further heated by the coherent radiation from laser 30. The heated effluvia then passes through scrubber 25.

The scrubber 25 ionizes particulate matter in the effluvia, such as the heavy metals and arsenic, and causes it to collect on or about one of the electrodes. The scrubber 25 includes petcocks 23 which permit the collected particles to be removed.

The effluvia flows up the secondary stack 22 and through the heat exchanger 26 into the cooling chamber 28. Within the cooling chamber 28, the heat exchanger 260 reduces the temperature of the effluvia to between 100° and 200° F.

The effluvia then flows through one or both of the scrubbers 24 and 24' where additional remaining particulate matter is substantially electrostatically scrubbed from the effluvia.

The vacuum pump 302 forces the effluvia to flow from chamber 300 through a pipe below the surface of pool 30 which is filled with water.

The water neutralizes certain oxides remaining in the effluvia. Thus sulphur dioxide ($SO_2$) becomes sulphur trioxide ($SO_3$) which in the water converts to sulphuric acid ($H_2SO_4$). Moreover, any ozone ($O_3$) is converted to oxygen.

The effluent is bubbled up through pipe 305 into carbon filter 310 and then passes into the wind tunnel 312. Pump 307 may assist in this process. The fan 316 mixes the effluent with atmospheric air. At this point the effluent consists of dilute carbon dioxide and water vapor. This may be freely exhausted into the atmosphere.

As previously noted, some of the effluvia are returned to the secondary reactor and used in the process by compressor 316. The recirculated gases are injected into the secondary reactor at a rate of 300 CFH.

Other hazardous wastes may be treated in the same manner. Infectious waste is reduced in the primary reaction chamber 16. Since it is combustible it may be simultaneously reduced in the secondary reaction chamber.

Preliminary tests have been conducted in respect to the present invention. The incinerator ash from a local municipality had the following analysis:

|  | 1988 |
|---|---|
| % Total Solids | 63 |
| % Volatile Solid | 4.04 |
| pH | 6.94 |
| Total CN (mg/kg) | 1.17 |
| Oil & Grease, ppm | 8508 |
| As, (mg/kg) | 40 |
| Ba, (mg/kg) | 570 |
| Cd, (mg/kg) | 110 |
| Cr, (mg/kg) | 180 |
| Cu, (mg/kg) | 1049 |
| Lead (mg/kg) | 159 |
| Hg, (mg/kg) | 0.182 |
| Mo, (mg/kg) | <33 |
| Ni, (mg/kg) | 233 |
| Se, (mg/kg) | <0.67 |
| Ag, (mg/kg) | 8.49 |
| Zn, (mg/kg) | 1039 |
| TOX, (mg/kg) | <317 |
| TOC, (mg/kg) | 5714 |
| Phenols, (mg/kg) | 0.16 |
| Heating Value | Non-combust. |

This incinerator ash was converted to slag in a chamber similar to primary reaction chamber 16 using the laser 30. An analysis of the slag produced the following results:

| ANALYSIS | RESULT AS RECEIVED | | LIMIT OF QUANTITATION |
|---|---|---|---|
| Moisture | <0.1 | % by wt. | 0.1 |
| Arsenic | <1. | mg/kg | 1. |
| Barium | <20. | mg/kg | 20. |
| Cadmium | <0.5 | mg/kg | 0.5 |
| Chromium | 17. | mg/kg | 5. |
| Copper | 86. | mg/kg | 2. |
| Lead | <5. | mg/kg | 5. |
| Mercury | <0.1 | mg/kg | 0.1 |
| Molybdenum | <10. | mg/kg | 10. |
| Nickel | 19. | mg/kg | 4. |
| Selenium | <0.5 | mg/kg | 0.5 |
| Silver | <1. | mg/kg | 1. |
| Zinc | 151. | mg/kg | 2. |
| Oil (Soxhlet Ext.) | 0.02 | % | 0.01 |
| Cyanide, Total | <0.05 | mg/kg | 0.05 |
| pH | 5.87 | | |

"Moisture" represents the loss in weight of the sample after oven drying at 103–105° C.

I claim:

1. A process for removing harmful constituents from the ash by-product of previously incinerated waste material, comprising the steps of:

raising the temperature of the ash to form a molten slag in a primary reaction chamber using coherent radiation directed upon the ash, permitting the molten slag to flow from the primary reaction chamber and collecting the removed slag, directing the gas and particulate effluent generated by the formation of the molten slag into a second reaction chamber and reburning the effluent in said secondary reaction chamber to reduce remaining products of incomplete combustion, electrostatically scrubbing particulates from the effluent, treating the gaseous part of the effluent to remove harmful chemicals therefrom, and releasing the treated gaseous portion of the effluent to the atmosphere.

2. A process in accordance with claim 1 wherein the ash by-product of previously incinerated waste material is fly ash.

3. A process in accordance with claim 1 wherein combustible excitation waste is converted to a molten state in the secondary reaction chamber and then conducted to the primary reaction chamber, and said effluent is conducted from the primary reaction chamber to the secondary reaction chamber in contact with the molten excitation material flowing from the secondary reaction chamber to the primary reaction chamber.

4. A process for removing certain constituents from the solid product of prior combustion, comprising the steps of:

heating said solid product to a molten state in a primary reaction chamber using coherent radiation, conducting the molten material from the primary reaction chamber, conducting the gaseous and particulate effluent resulting from heating said solid product to a secondary reaction chamber, further heating said effluent in said secondary reaction chamber to substantially complete the combustion of products of incomplete combustion in said effluent, and processing said effluent to make it acceptable for release into the atmosphere.

5. The process in accordance with claim 4 wherein the step of processing the effluent includes removing particulate matter and chemically reacting the effluent in water to convert certain constituents therefrom.

6. The process in accordance with claim 5 including diluting the effluent with air and releasing it into the atmosphere primarily as a mixture of carbon dioxide and air.

7. The process in accordance with claim 5 where the particulate matter is removed from the effluent using an electrostatic scrubber.

8. The process in accordance with claim 4 including:

heating a combustible material in the secondary reaction chamber to form a molten product, conducting the molten product of the combustion of the combustible material from the secondary reaction chamber to the primary reaction chamber along the same path as taken by the effluent flowing from the primary reaction chamber to the secondary reaction chamber, thereby heating the effluent as it flows to the secondary reaction chamber.

9. The process in accordance with claim 4 wherein said solid product is particulate fly ash.

10. The process in accordance with claim 9 wherein said solid product is continuously fed into the primary reaction chamber.

11. The process is accordance with claim 4 including forming said molten material into a pebble-like material upon removal form the primary reaction chamber.

12. The process in accordance with claim 4 including heating said effluent in said secondary reaction chamber with coherent radiation.

13. A process for removing harmful constituents from incombustible waste material, comprising the steps of:

raising the temperature of the waste material to form a molten slag in a primary reaction chamber, permitting excess slag to flow from the primary reaction chamber, directing the gas and particulate effluent generated by formation of the molten slag into a second reaction chamber and reburning the effluent in said second reaction chamber to reduce the remaining products of incomplete combustion, removing particulates from the effluent, treating the gaseous part of the effluent to remove harmful chemicals therefrom, and releasing the treated gaseous portion of the effluent to the atmosphere.

14. A process for removing harmful constituents from waste materials, comprising the steps of:

heating the waste material in a primary reaction chamber until it reaches a molten state, conducting excess molten waste material from the primary reaction chamber and collecting the removed material, reburning the effluent resulting from the conversion of the waste material in a secondary reaction chamber, hearing a combustible material in the secondary reaction chamber to form a molten product, conducting said molten product from the secondary reaction chamber to the primary reaction chamber along the same path taken by the effluent flowing from the primary reaction chamber to the secondary reaction chamber, thereby heating the effluent as it flows to the secondary reaction chamber.

15. A process for removing harmful constituents from fly ash, comprising the steps of:

providing a primary reaction chamber and a secondary reaction chamber, converting excitation waste to a molten state in the secondary reaction chamber and conducting the molten excitation waste from the secondary reaction chamber to the primary reaction chamber, heating fly ash and excitation waste in the primary reaction until it reaches a molten state sin coherent radiation, conducting the resultant molten waste material from the primary reaction chamber and collecting the removed material, and reburning the effluent resulting from the conversion of the fly ash to a molten state in the secondary reaction chamber.

16. A process in accordance with claim 15 including the step of electrostatically scrubbing particulates from the effluent.

* * * * *